United States Patent
Tran et al.

(10) Patent No.: US 11,468,585 B2
(45) Date of Patent: Oct. 11, 2022

(54) PSEUDO RGB-D FOR SELF-IMPROVING MONOCULAR SLAM AND DEPTH PREDICTION

(71) Applicant: NEC Laboratories America, Inc., Princeton, NJ (US)

(72) Inventors: Quoc-Huy Tran, Santa Clara, CA (US); Pan Ji, San Jose, CA (US); Manmohan Chandraker, Santa Clara, CA (US); Lokender Tiwari, San Jose, CA (US)

(73) Assignee: NEC Corporation

( * ) Notice: Subject to any disclaimer, the term of this patent is extended or adjusted under 35 U.S.C. 154(b) by 138 days.

(21) Appl. No.: 16/987,705

(22) Filed: Aug. 7, 2020

(65) Prior Publication Data

US 2021/0065391 A1   Mar. 4, 2021

Related U.S. Application Data

(60) Provisional application No. 62/935,669, filed on Nov. 15, 2019, provisional application No. 62/892,018, filed on Aug. 27, 2019.

(51) Int. Cl.
| | |
|---|---|
| *G06T 7/579* | (2017.01) |
| *G06N 3/08* | (2006.01) |
| *G06T 15/10* | (2011.01) |
| *G06T 7/20* | (2017.01) |
| *G06T 7/80* | (2017.01) |
| *G06T 15/00* | (2011.01) |

(52) U.S. Cl.
CPC ............. *G06T 7/579* (2017.01); *G06N 3/08* (2013.01); *G06T 7/20* (2013.01); *G06T 7/80* (2017.01); *G06T 15/005* (2013.01); *G06T 15/10* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 2010/0111370 A1* | 5/2010 | Black | G06Q 30/0601 705/26.1 |
| 2017/0278289 A1* | 9/2017 | Marino | G06T 11/60 |
| 2017/0316602 A1* | 11/2017 | Smirnov | G06T 5/50 |

(Continued)

OTHER PUBLICATIONS

DF-Net: Unsupervised Joint Learning of Depth and Flow using Cross-Task Consistency. Zou et al. (Year: 2018).*

(Continued)

*Primary Examiner* — Delomia L Gilliard
(74) *Attorney, Agent, or Firm* — Joseph Kolodka

(57) ABSTRACT

A method for improving geometry-based monocular structure from motion (SfM) by exploiting depth maps predicted by convolutional neural networks (CNNs) is presented. The method includes capturing a sequence of RGB images from an unlabeled monocular video stream obtained by a monocular camera, feeding the RGB images into a depth estimation/refinement module, outputting depth maps, feeding the depth maps and the RGB images to a pose estimation/refinement module, the depths maps and the RGB images collectively defining pseudo RGB-D images, outputting camera poses and point clouds, and constructing a 3D map of a surrounding environment displayed on a visualization device.

20 Claims, 10 Drawing Sheets

(56) References Cited

U.S. PATENT DOCUMENTS

| | | | | |
|---|---|---|---|---|
| 2019/0005670 A1* | 1/2019 | DeTone | ................. | G06V 20/64 |
| 2019/0139179 A1* | 5/2019 | Wang | ..................... | G06T 5/002 |
| 2019/0213481 A1* | 7/2019 | Godard | .................. | G06F 17/16 |
| 2019/0279379 A1* | 9/2019 | Srinivasan | ................ | G06T 7/50 |
| 2020/0364554 A1* | 11/2020 | Wang | ....................... | G06N 3/08 |
| 2021/0004660 A1* | 1/2021 | Ambrus | ................ | G06V 10/82 |

OTHER PUBLICATIONS

Mur-Artal et al., "ORB-SLAM: a Versatile and Accurate Monocular SLAM System", IEEE Transactions on Robotics. Aug. 24, 2005. vol. 31, No. 5. pp. 1147-1163.

Mur-Artal et al., "ORB-SLAM2: an Open-Source SLAM System for Monocular, Stereo and RGB-D Cameras", IEEE Transactions on Robotics. Jun. 12, 2017. vol. 33, No. 5. pp. 1255-1262.

Tateno, et al. "CNN-SLAM: Real-time dense monocular SLAM with learned depth prediction", Proceedings of the IEEE Conference on Computer Vision and Pattern Recognition 2017. pp. 6243-6252.

Yang, et al., "Deep Virtual Stereo Odometry: Leveraging Deep Depth Prediction for Monocular Direct Sparse Odometry", Proceedings of the European Conference on Computer Vision (ECCV) 2018. pp. 817-833.

Zhou et al., "Unsupervised Learning of Depth and Ego-Motion from Video", Proceedings of the IEEE Conference on Computer Vision and Pattern Recognition 2017. pp. 1851-1858.

* cited by examiner

Symmetric Depth Transfer Loss $$\mathcal{T}^i_{c \leftrightarrow k1}(\mathbf{w}) = |d^i_{c \to k1}(\mathbf{w}) - d^i_{k1}(\mathbf{w})| + |d^i_{k1 \to c}(\mathbf{w}) - d^i_c(\mathbf{w})|$$

Depth Consistency Loss $$\mathcal{D}_c = \frac{\sum_{i \in \mathcal{X}} |d^i_c(\mathbf{w}) - d^i_c(\text{SLAM})|}{|\mathcal{X}|}$$

Photometric Reconstruction Loss $$\mathcal{P}_c = pe(\mathcal{I}_{c+1 \to c}(d_c(\mathbf{w}), \mathbf{T}^{\text{SLAM}}_{c+1 \to c}, \mathbf{K}), \mathcal{I}_c) + pe(\mathcal{I}_{c-1 \to c}(d_c(\mathbf{w}), \mathbf{T}^{\text{SLAM}}_{c-1 \to c}, \mathbf{K}), \mathcal{I}_c)$$

Weighted Sum of Narrow and Wide Baseline Losses $$\mathcal{L} = \alpha \mathcal{P}_c + \beta \mathcal{S}_c + \gamma \mathcal{D}_c + \mu(\mathcal{T}_{c \leftrightarrow k1} + \mathcal{T}_{c \leftrightarrow k2} + \mathcal{T}_{k1 \leftrightarrow k2})$$

PSEUDO RGB-D FOR SELF-IMPROVING MONOCULAR SLAM AND DEPTH PREDICTION

RELATED APPLICATION INFORMATION

This application claims priority to Provisional Application No. 62/892,018, filed on Aug. 27, 2019, and Provisional Application No. 62/935,669, filed on Nov. 15, 2019, the contents of which are incorporated herein by reference in their entirety.

BACKGROUND

Technical Field

The present invention relates to computer vision technology and, more particularly, to methods and systems for pseudo RGB-D self-improving monocular simultaneous localization and mapping (SLAM) and depth prediction.

Description of the Related Art

An active research area in the field of computer vision is Structure from Motion (SfM), which aims to estimate the ego-motion of an agent (e.g., vehicle, robot, etc.) and three-dimensional (3D) scene structure of an environment by using the input of one or multiple cameras. SfM plays an important role in many computer vision applications such as autonomous driving and augmented reality. Due to the benefits of low cost and little calibration effort, monocular SfM has attracted a lot of research interest in the past few decades. However, traditional geometry-based methods for monocular SfM cannot recover the absolute scale of camera trajectory and depth map, which also leads to scale drifts after a period of operation. In addition, traditional geometry-based methods usually rely on keypoint triangulation, which tends to break down in challenging conditions such as degenerate motions (e.g., small motions, pure rotational motions, etc.).

SUMMARY

A computer-implemented method for improving geometry-based monocular structure from motion (SfM) by exploiting depth maps predicted by convolutional neural networks (CNNs) is presented. The method includes capturing a sequence of RGB images from an unlabeled monocular video stream obtained by a monocular camera, feeding the RGB images into a depth estimation/refinement module, outputting depth maps, feeding the depth maps and the RGB images to a pose estimation/refinement module, the depths maps and the RGB images collectively defining pseudo RGB-D images, outputting camera poses and point clouds, and constructing a 3D map of a surrounding environment displayed on a visualization device.

A non-transitory computer-readable storage medium comprising a computer-readable program is presented for improving geometry-based monocular structure from motion (SfM) by exploiting depth maps predicted by convolutional neural networks (CNNs), wherein the computer-readable program when executed on a computer causes the computer to perform the steps of capturing a sequence of RGB images from an unlabeled monocular video stream obtained by a monocular camera, feeding the RGB images into a depth estimation/refinement module, outputting depth maps, feeding the depth maps and the RGB images to a pose estimation/refinement module, the depths maps and the RGB images collectively defining pseudo RGB-D images, outputting camera poses and point clouds, and constructing a 3D map of a surrounding environment displayed on a visualization device.

A system for improving geometry-based monocular structure from motion (SfM) by exploiting depth maps predicted by convolutional neural networks (CNNs) is presented. The system includes a memory and one or more processors in communication with the memory configured to capture a sequence of RGB images from an unlabeled monocular video stream obtained by a monocular camera, feed the RGB images into a depth estimation/refinement module, outputting depth maps, feed the depth maps and the RGB images to a pose estimation/refinement module, the depths maps and the RGB images collectively defining pseudo RGB-D images, output camera poses and point clouds, and construct a 3D map of a surrounding environment displayed on a visualization device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 8 is a block/flow diagram of equations employed in an exemplary method for improving geometry-based monocular structure from motion (SfM) by exploiting depth maps predicted by convolutional neural networks (CNNs), in accordance with embodiments of the present invention;

DETAILED DESCRIPTION OF PREFERRED EMBODIMENTS

Figure 1:
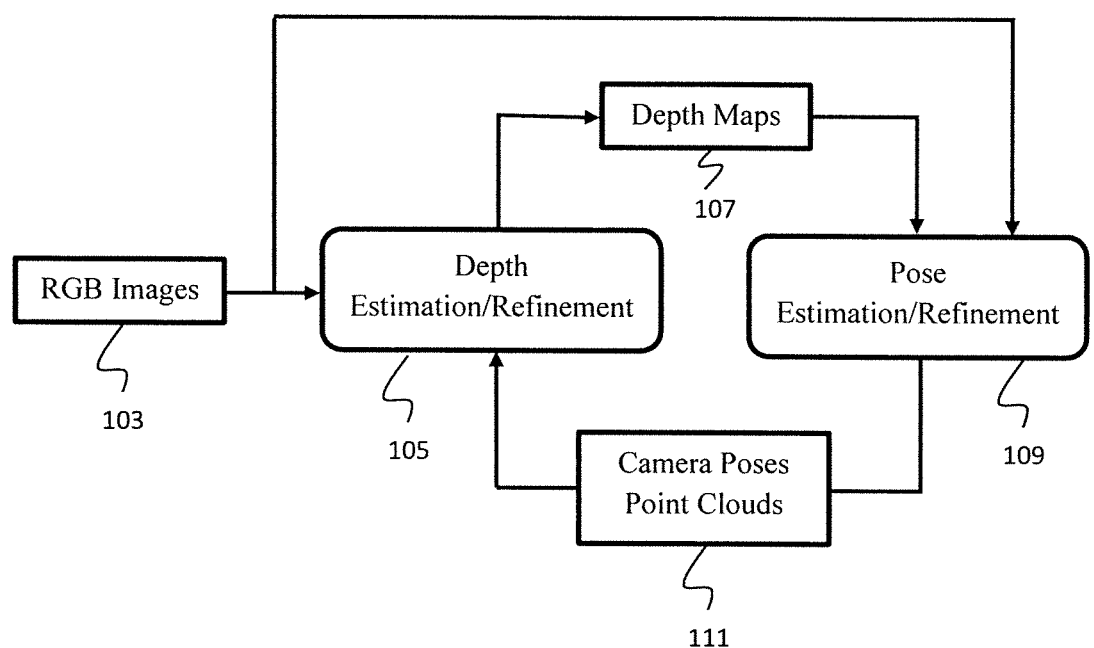
FIG. 1 is a block/flow diagram of a method for constructing a three-dimensional (3D) map of the surrounding environment by employing a depth estimation/refinement module and a pose estimation/refinement module, in accordance with embodiments of the present invention.

One of the most reliable cues toward three-dimensional (3D) perception from a monocular camera arises from camera motion that induces multiple-view geometric constraints where the 3D scene structure is encoded. Over the years, Simultaneous Localization and Mapping (SLAM) has been studied to simultaneously recover the 3D scene structure of the surroundings and estimate the ego-motion of the agent. With the advent of Convolutional Neural Networks (CNNs), unsupervised learning of single-view depth estimation has emerged as a promising alternative to the traditional geometric approaches. Such methods rely on CNNs to extract meaningful depth cues (e.g., shading, texture, and semantics) from a single image, yielding very promising results.

Despite the general maturity of monocular geometric SLAM and the rapid advances in unsupervised monocular depth prediction approaches, they both still have their own limitations.

Regarding monocular SLAM, traditional monocular SLAM has well-known limitations in robustness and accuracy as compared to those leveraging active depth sensors, e.g., RGB-D SLAM (red-green-blue-depth). RGB-D refers to a combination of an RGB image and its corresponding depth image. A depth image is an image channel in which each pixel relates to a distance between the image plane and the corresponding object in the RGB image. This performance issue is due to the inherent scale ambiguity of depth recovery from monocular cameras, which causes the so-called scale drift in both the camera trajectory and 3D scene depth, and thus lowers robustness and accuracy of conventional monocular SLAM. In addition, the triangulation-based depth estimation employed by traditional SLAM methods is degenerate under pure rotational camera motion.

Regarding unsupervised monocular depth prediction, most of the unsupervised and self-supervised methods formulate single image depth estimation as a novel-view synthesis problem, with appearance based photometric losses being central to the training strategy. Usually, these models train two networks, one each for pose and depth. As photometric losses largely rely on the brightness constancy assumption, nearly all existing self-supervised approaches operate in a narrow baseline setting optimizing the loss over a snippet of 2-5 consecutive frames.

Consequently, some traditional models work very well for close range points, but generate inaccurate depth estimates for points that are farther away. While it is well known that a wide baseline yields better depth estimates for points at larger depth, a straightforward extension of existing CNN based approaches is inadequate for the following reasons. A wide baseline in a video sequence implies a larger temporal window, which in most practical scenarios violates the brightness constancy assumption, rendering the photometric loss ineffective. Another reason is that larger temporal windows (wider baselines) would also imply more occluded regions that behave as outliers. Unless these aspects are effectively handled, training of CNN based depth and pose networks in the wide baseline setting leads to inaccuracies and biases.

In view of the limitations in both monocular geometric SLAM and unsupervised monocular depth estimation approaches, a particularly interesting question to ask is whether these two approaches can complement each other and mitigate the issues discussed above. The exemplary embodiments make contributions towards answering this question. Specifically, the exemplary embodiments of the present invention propose a self-supervised, self-improving framework of these two tasks, which improves the robustness and accuracy on both monocular geometric SLAM and unsupervised monocular depth estimation approaches.

While the performance gap between geometric SLAM and self-supervised learning-based SLAM methods is still large, incorporating depth information improves the robustness of geometric SLAM methods. Inspired by this success of RGB-D SLAM, the exemplary methods postulate the use of an unsupervised CNN-based depth estimation model as a pseudo depth sensor, which allows the design of a self-supervised approach, pseudo RGB-D SLAM (pRGBD-SLAM) that only uses monocular cameras and yet achieves significant improvements in robustness and accuracy as compared to RGB SLAM.

The fusion of geometric SLAM and CNN-based monocular depth estimation turns out to be symbiotic and this complementary nature sets the basis of the self-improving framework. To improve the depth predictions, the exemplary embodiments make use of certain modifications in the training strategy. The exemplary embodiments eschew the learning-based pose estimates in favor of geometric SLAM based estimates and the exemplary embodiments make use of common tracked keypoints from neighboring keyframes and impose a symmetric depth transfer and a depth consistency loss on the CNN model. These adaptations are based on the observation that both pose estimates and sparse 3D feature point estimates from geometric SLAM are robust, as most techniques usually apply multiple bundle adjustment iterations over wide baseline depth estimates of common keypoints. This observation and the subsequent modification are key to the self-improving framework, which can leverage any unsupervised CNN-based depth estimation model and a modern monocular SLAM method.

The exemplary embodiments test the framework with ORBSLAM as the geometric SLAM method and MonoDepth2 as the CNN-based model. The framework runs in a simple alternating update fashion. In particular, the exemplary embodiments use depth maps from the CNN-based depth network and run pRGBD-SLAM and the exemplary embodiments inject the outputs of pRGBD-SLAM, e.g., the relative camera poses and common tracked keypoints and keyframes to fine-tune the depth network parameters to improve the depth prediction. Then, the exemplary embodiments repeat the process until no improvement is observed.

Therefore, the exemplary embodiments introduce a self-improving strategy to inject into depth prediction networks the supervision from SLAM outputs, which stem from more generally applicable geometric principles.

The exemplary embodiments further introduce two wide baseline losses, e.g., the symmetric depth transfer loss and the depth consistency loss on common tracked points, and introduce a joint narrow and wide baseline based depth prediction learning setup, where appearance based losses are computed on narrow baselines and purely geometric losses on wide baselines (non-consecutive temporally distant keyframes).

FIG. 1 is a block/flow diagram of a method for constructing a 3D map of the surrounding environment by employing a depth estimation/refinement module and a pose estimation/refinement module, in accordance with embodiments of the present invention.

At the first iteration, given a sequence of RGB images 103 (e.g., from a monocular video), the exemplary method first passes the RGB images 103 to the depth estimation/refinement module 105, which outputs estimated depth maps 107. The depth maps 107 are then fed together with the RGB images 103 to the pose estimation/refinement module 109, which outputs the estimated camera poses and point clouds 111. The camera poses and point clouds 111 are then used in the depth estimation/refinement module during the next iteration to get the refined depth maps, which are then used in the pose estimation/refinement module to get the refined camera poses and point clouds. The above steps of refining depth maps and camera poses are repeated for a few iterations until no improvement is observed.

Figure 2:
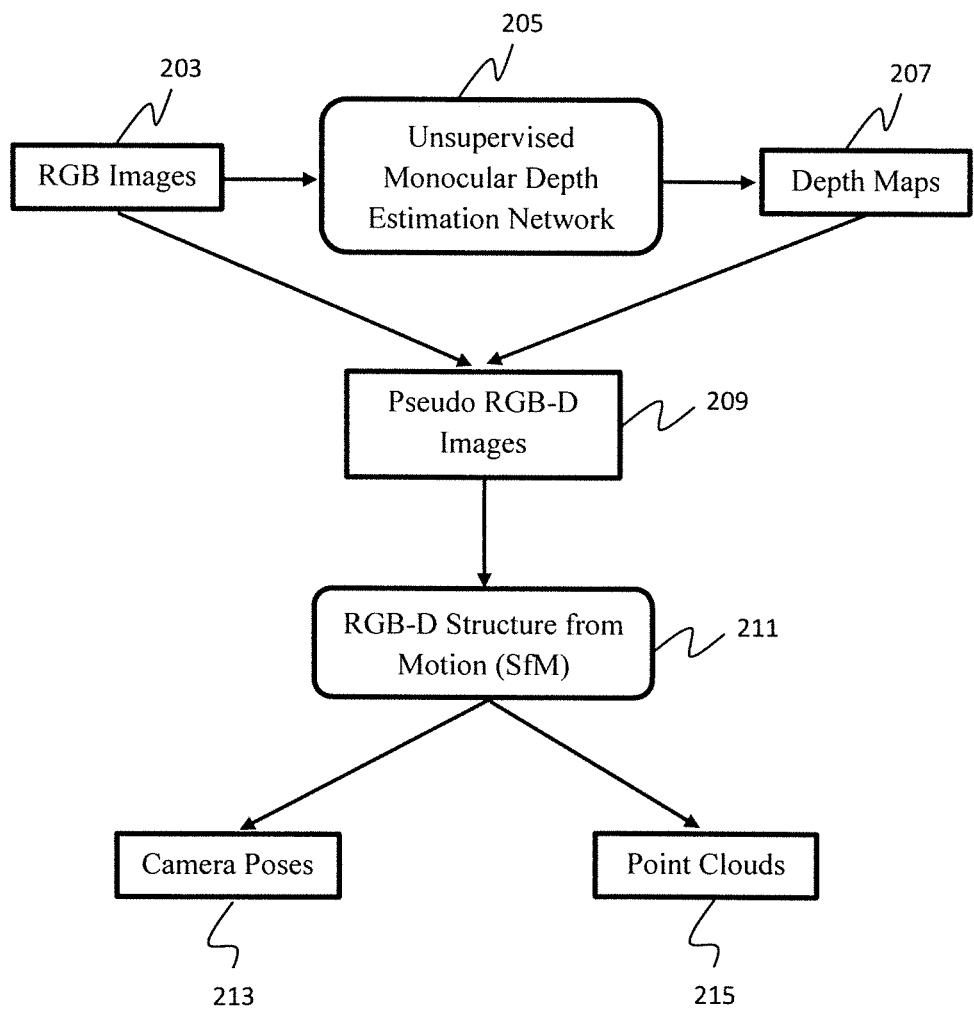
FIG. 2 is a block/flow diagram of an exemplary pose estimation/refinement module, in accordance with embodiments of the present invention.

FIG. 2 is a block/flow diagram of an exemplary pose estimation/refinement module, in accordance with embodiments of the present invention.

Given the pseudo RGB-D images 209 (the input RGB images 203 and the estimated/refined depth maps 207 from the depth estimation/refinement module), the exemplary method performs RGB-D SfM 211 to acquire the estimated/refined camera poses 213 and point clouds 215. Since the input RGB-D images 209 leverage rich priors from the depth network, the output camera poses 213 and point clouds 215 suffer less from scale drifts. In addition, the absolute scale is computed only once during the initialization of RGB-D SfM by using additional cues such as known object sizes.

SLAM and SfM are concerned with the same problem, that is, estimating the ego-motion and 3D scene structure. As such, these two terms (SLAM and SfM) will be used interchangeably in this disclosure.

Figure 3:
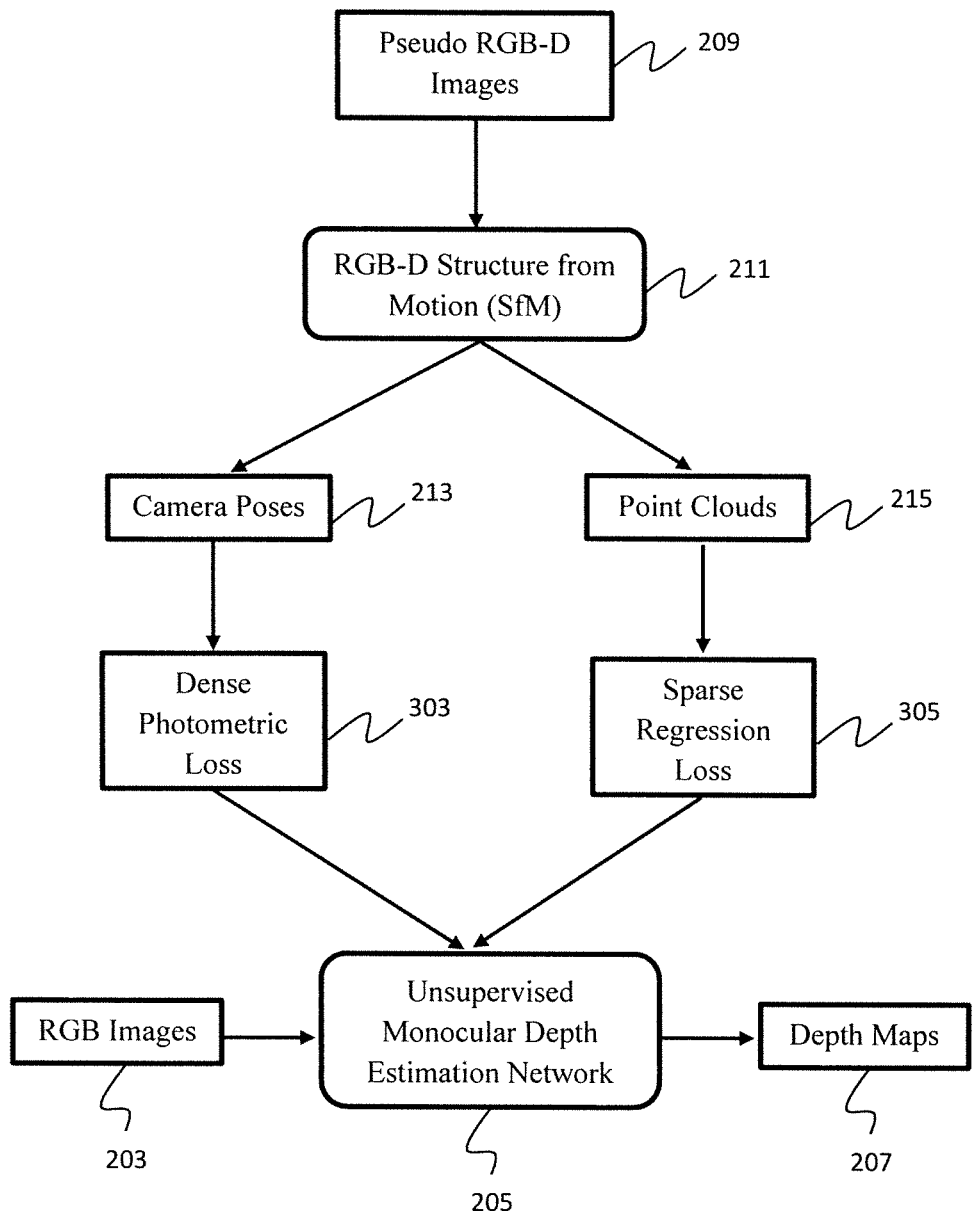
FIG. 3 is a block/flow diagram of an exemplary depth estimation/refinement module, in accordance with embodiments of the present invention.

FIG. 3 is a block/flow diagram of an exemplary depth estimation/refinement module, in accordance with embodiments of the present invention.

The exemplary method uses the estimated/refined camera poses 213 and point clouds 215 from the pose estimation/refinement module to train/finetune a monocular depth estimation network 205 in an unsupervised manner. In particular, the exemplary method leverages the camera poses from the pose estimation/refinement module and the CNN predicted depth map of the current frame to synthesize the next frame and minimize the pixel intensity discrepancies between the synthesized next frame and the input next frame (namely, dense photometric loss 303). In addition, the exemplary method adds a sparse regression loss 305, which minimizes the differences between the CNN predicted point clouds and the point clouds from the pose estimation/refinement module.

Therefore, in accordance with FIGS. 1-3, the exemplary embodiments of the present invention improve geometry based monocular SfM by exploiting depth maps predicted by CNNs. In particular, the exemplary method uses an unsupervised monocular depth estimation network, which needs only unlabeled monocular videos for training. The network incorporates by learning from a large amount of training data, and thus the predicted depth maps do not suffer from scale drifts. Next, the exemplary embodiments consider CNN estimated depth maps as if they come from pseudo depth cameras (e.g., LiDAR), essentially transforming RGB input into pseudo RGB-D input. The pseudo RGB-D input enables the application of RGB-D SfM, which uses CNN estimated depth maps to initialize keyframe depth maps and refines them by using bundle adjustment. During the initialization of RGB-D SfM, the exemplary embodiments compute the absolute scale only once by using additional cues such as known object sizes.

In addition, the exemplary embodiments use the camera poses (which are scale consistent) and point clouds (which are temporally consistent) output by RGB-D SfM to further finetune the depth estimation network, leading to improved CNN predicted depth maps. Lastly, the exemplary embodiments can repeat the above steps of improving camera trajectory and depth prediction for a few iterations until convergence.

Figure 4:
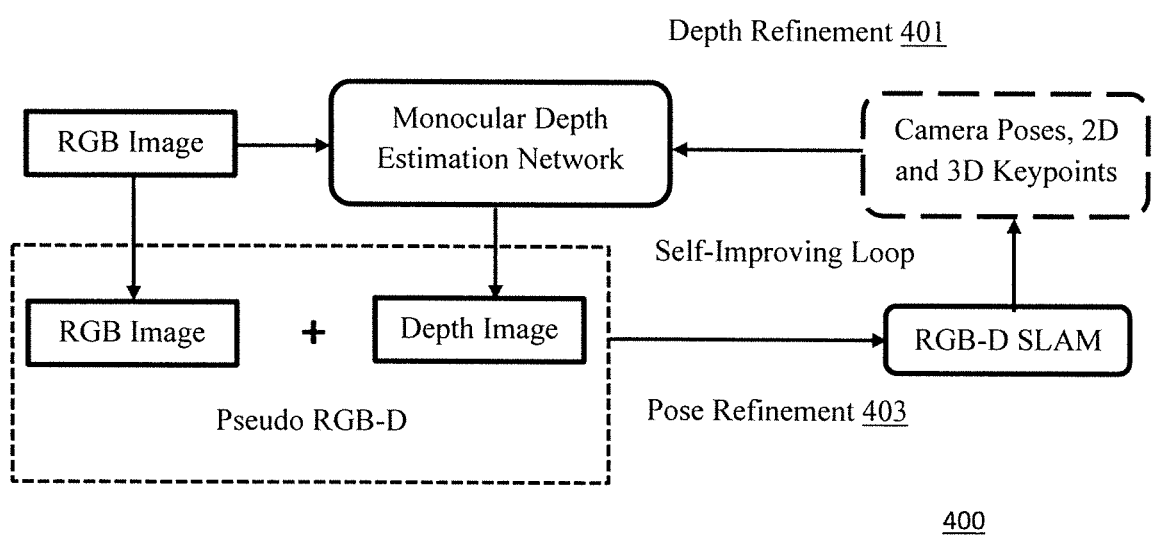
FIG. 4 is a block/flow diagram of an exemplary self-improving framework employing the pose estimation/refinement module of FIG. 2 and the depth estimation/refinement module of FIG. 3, in accordance with embodiments of the present invention.

FIG. 4 is a block/flow diagram 400 of an exemplary self-improving framework employing the pose estimation/refinement module of FIG. 2 and the depth estimation/refinement module of FIG. 3, in accordance with embodiments of the present invention.

FIG. 4 is an overview of the self-improving monocular SLAM and depth prediction illustrating the pseudo RGB-D-SLAM framework. The framework alternates between pose refinement 403 using pseudo RGB-D SLAM, and depth refinement 401 using a monocular depth (D) network.

The exemplary self-improving framework 400 leverages the strengths of each, the unsupervised single-image depth estimation and the geometric SLAM approaches, to mitigate the other's shortcomings. On one hand, the depth network usually generates reliable depth estimates for nearby points, which assist in improving the geometric SLAM estimates of poses and sparse 3D points. On the other hand, geometric SLAM methods rely on a more holistic view of the scene to generate robust pose estimates as well as identify persistent 3D points that are visible across many frames, thus providing an opportunity to perform wide-baseline and reliable sparse depth estimation. The exemplary framework leverages these sparse, but robust estimates to improve the noisier depth estimates of the farther scene points by minimizing a blend of the symmetric transfer and depth consistency losses and the commonly used appearance-based loss. In the following iteration, this improved depth estimate further enhances the capability of geometric SLAM and the cycle continues until the improvements become negligible. Even in the absence of ground truth, the self-improving framework continues to produce better pose and depth estimates.

Figure 5:
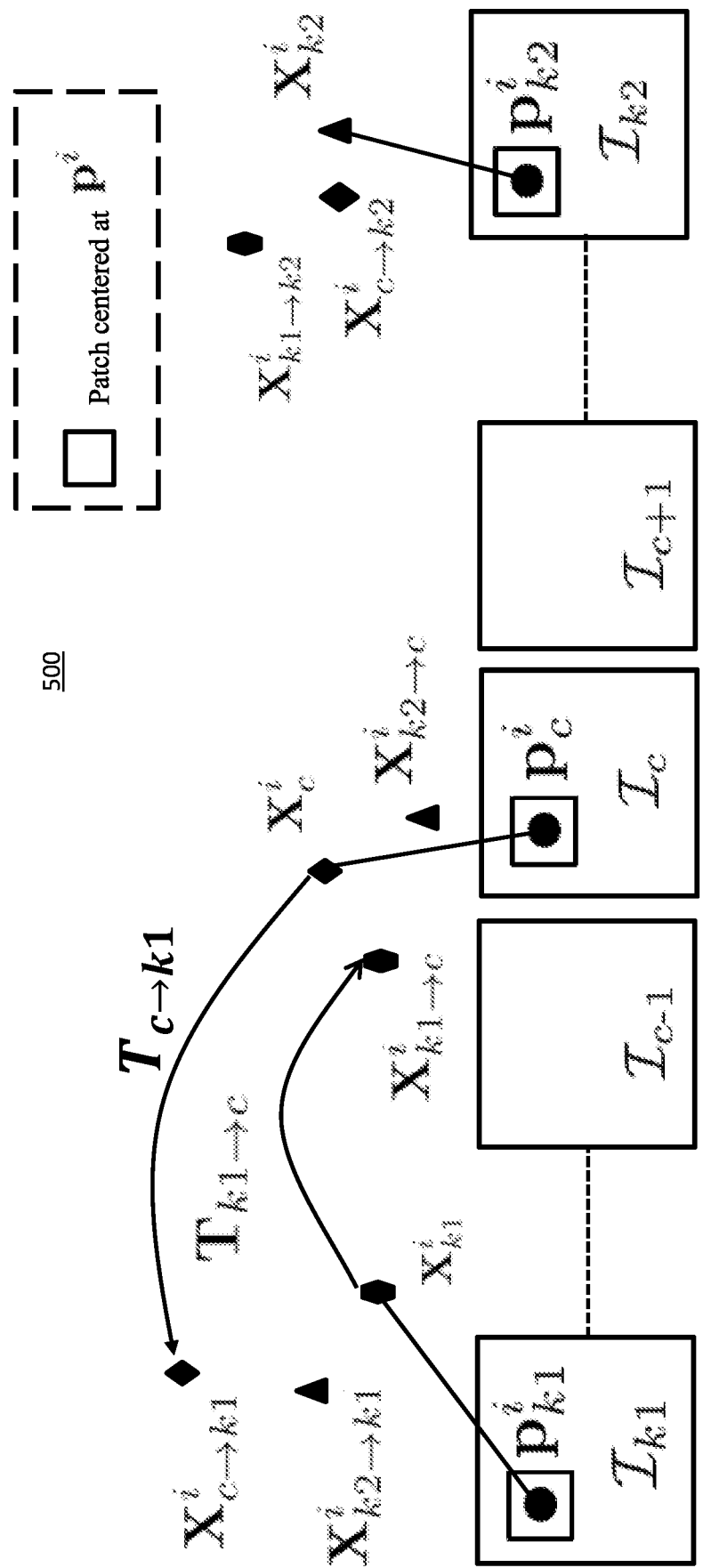
FIG. 5 is a block/flow diagram illustrating narrow and wide baseline losses, in accordance with embodiments of the present invention.

FIG. 5 is a block/flow diagram 500 illustrating narrow and wide baseline losses, in accordance with embodiments of the present invention.

Narrow baseline photometric and smoothness losses involve keyframe $I_c$ and temporally adjacent frames $I_{c-1}$ and $I_{c+1}$, and wide baseline symmetric depth transfer and depth consistency losses involve keyframe $I_c$ and temporally farther keyframes $I_{k1}$ and $I_{k2}$. More details will be provided below with respect to the symmetric depth transfer loss, the depth consistency loss, and the photometric reconstruction loss.

Regarding pose refinement and pseudo RGB-D for improving monocular SLAM, the exemplary methods employ an SLAM system, e.g., the RGB-D version of ORB-SLAM, to process the pseudo RGB-D data, yielding camera poses as well as 3D map points and the associated 2D keypoints. Any other geometric SLAM system that provides these output estimates can also be used in place of ORB-SLAM. A trivial direct use of pseudo RGB-D data to run RGB-D ORBSLAM is not possible, because CNN might predict depth at a very different scale compared to depth measurements from real active sensors, e.g., light detection and ranging (LiDAR). Keeping the above difference in mind, an adaptation is presented in order for RGB-D ORB-SLAM to work well in the current setting.

It is first noted that RGB-D ORB-SLAM transforms the depth data into disparity on a virtual stereo to reuse the framework of stereo ORB-SLAM. Specifically, considering a keypoint with 2D coordinates $(u_l, v_l)$ (e.g., $u_l$ and $v_l$ denote the horizontal and vertical coordinates, respectively) and a CNN-predicted depth, $d_l$, the corresponding 2D keypoint coordinates $(u_r, v_r)$ on the virtual rectified right view are: $u_r = u_l - f_x b / d_l$, $v_r = v_l$, where $f_x$ is the horizontal focal length and b is the virtual stereo baseline.

Regarding depth refinement, the method starts from the pre-trained depth network of Monodepth2, a state-of-the-art monocular depth estimation network, and fine-tunes its network parameters with the camera poses, 3D map points and the associated 2D keypoints produced by the above pseudo RGB-D ORB-SLAM (pRGBD-SLAM). In contrast to Monodepth2, which relies only on the narrow baseline photometric reconstruction loss between adjacent frames for short-term consistencies, the exemplary methods introduce wide baseline symmetric depth transfer and sparse depth consistency losses to introduce long-term consistencies. The final loss includes both narrow and wide baseline losses. The narrow baseline losses, e.g., photometric and smoothness losses, involve the current keyframe $I_c$ and its temporally adjacent frames $I_{c-1}$ and $I_{c+1}$, while wide baseline losses are computed on the current keyframe $I_c$ and the two neighboring keyframes $I_{k1}$ and $I_{k2}$ that are temporally farther than $I_{c-1}$ and $I_{c+1}$.

Next, the exemplary method introduces the notation and describes the losses.

Let X represent a set of common tracked keypoints visible in all three keyframes $I_{k1}$, $I_c$ and $I_{k2}$ obtained from pRGBD-SLAM.

Note that k1 and k2 are two neighboring keyframes of the current frame c (e.g., k1<c<k2) in which keypoints are visible.

Let $p_{k1}^i = [p_{k1}^{i1}, p_{k1}^{i2}]$, $p_c^i = [p_c^{i1}, p_c^{i2}]$ and $p_{k2}^i = [p_{k2}^{i1}, p_{k2}^{i2}]$ be the 2D coordinates of the $i^{th}$ common tracked keypoint in the keyframes $I_{k1}$, $I_c$ and $I_{k2}$ respectively, and the associated depth values obtained from pRGBD-SLAM are represented by $d_{k1}^i(SLAM)$, $d_c^i(SLAM)$, and $d_{k2}^i(SLAM)$, respectively. The depth values corresponding to the keypoints $p_{k1}^i$, $p_c^i$ and $p_{k2}^i$ can also be obtained from the depth network and are represented by $d_{k1}^i(w)$, $d_c^i(w)$, and $d_{k2}^i(w)$ respectively, where w stands for the depth network parameters.

Regarding symmetric depth transfer loss, given the camera intrinsic matrix K, and the depth value $d_c^i(w)$ of the $i^{th}$ keypoint $p_c^i$, the 2D coordinates of the keypoint $p_c^i$ can be back-projected to its corresponding 3D coordinates as:

$$X_c^i(w) = K^{-1}[p_c^i, 1]^T d_c^i(w).$$

Let $T_{c \to k1}^{SLAM}$ represent the relative camera pose of frame k1 with respect to frame c obtained from pRGBD-SLAM. Using $T_{c \to k1}^{SLAM}$ the exemplary method can transfer the 3D point $X_c^i(w)$ from frame c to k1 as:

$$X_{c \to k1}^i(w) = T_{c \to k1}^{SLAM} X_c^i(w) = [x_{c \to k1}^i(w), y_{c \to k1}^i(w), d_{c \to k1}^i(w)]^T.$$

Here, $d_{c \to k1}^i(w)$ is the transferred depth of the $i^{th}$ keypoint from frame c to frame k1. Following the above procedure, the exemplary method can obtain the transferred depth $d_{k1 \to c}^i(w)$ of the same $i^{th}$ keypoint from frame k1 to frame c. The symmetric depth transfer loss of the keypoint $p_c^i$ between frame pair c and k1, is the sum of absolute errors ($\ell_1$ distance) between the transferred network-predicted depth $d_{c \to k1}^i(w)$ and the existing network-predicted depth $d_{k1}^i(w)$ in the target keyframe k1, and vice-versa. It can be written as:

$$\mathcal{T}_{c \leftrightarrow k1}^i(w) = |d_{c \to k1}^i(w) - d_{k1}^i(w)| + |d_{k1 \to c}^i(w) - d_c^i(w)|.$$

Similarly, the exemplary method can compute the symmetric depth transfer loss of the same $i^{th}$ keypoint between frame pair c and k2, e.g., $\mathcal{T}_{c \leftrightarrow k2}^i(w)$, and between k1 and k2, e.g. $\mathcal{T}_{k1 \leftrightarrow k2}^i(w)$.

The exemplary method accumulates the total symmetric transfer loss between frame c and k1 in $\mathcal{T}_{c \leftrightarrow k1}(w)$, which is the loss of all the common tracked keypoints and the points within the patch of size 5×5 centered at the common tracked keypoints. Similarly, the exemplary method computes the total symmetric depth transfer loss $\mathcal{T}_{c \leftrightarrow k2}$ and $\mathcal{T}_{k1 \leftrightarrow k2}$ between frame pair (c, k2), and (k1, k2), respectively.

Regarding depth consistency loss, the role of the depth consistency loss is to make a depth network's prediction consistent with the refined depth values obtained from the pRGBD-SLAM. Note that depth values from pRGBD-SLAM undergo multiple optimization over wide baselines and are hence more accurate and capture long-term consistencies. The exemplary method injects these long-term consistent depths from pRGBD-SLAM to depth network through the depth consistency loss.

The loss for frame c can be written as follows:

$$D_c = \frac{\Sigma_{i \in X} |d_c^i(w) - d_c^i(SLAM)|}{|X|}.$$

Regarding photometric reconstruction loss, the exemplary method denotes the relative camera pose of frame $I_{c-1}$ and $I_{c+1}$ with respect to current keyframe $I_c$ obtained from pRGBD-SLAM by $T_{c-1 \to c}^{SLAM}$ and $T_{c+1 \to c}^{SLAM}$, respectively. Using frame $I_{c+1}$, $T_{c+1 \to c}^{SLAM}$, network predicted depth map $d_c(w)$ of the keyframe $I_c$, and the camera intrinsic K, the exemplary method can synthesize the current frame $I_c$.

Let the synthesized frame be represented in the functional form as:

$$I_{c+1 \to c}(d_c(w), T_{c+1 \to c}^{SLAM}, K).$$

Similarly, the exemplary method can synthesize $I_{c-1 \to c}$ ($d_c(w)$, $T_{c-1 \to c}^{SLAM}$K) using frame $I_{c-1}$.

The photometric reconstruction error between the synthesized and the original current frame is then computed as:

$$\mathcal{P}_c = \text{pe}(I_{c+1 \to c}(d_c(w), T_{c+1 \to c}^{SLAM}, K), I_c) + \text{pe}(I_{c-1 \to c}(d_c(w), T_{c-1 \to c}^{SLAM}, K), I_c),$$

where the exemplary method constructs the photometric reconstruction error using the function pe(·,·). Additionally, the exemplary embodiments adopt the more robust per-pixel minimum error, multiscale strategy, auto-masking, and depth smoothness loss $\mathcal{S}_c$. The final loss for fine-tuning the depth network at the depth refinement step is a weighted sum of narrow baseline losses (e.g., photometric ($\mathcal{P}_c$) and smoothness loss ($\mathcal{S}_c$)), and wide baseline losses (e.g., symmetric depth transfer ($\mathcal{T}_{c \leftrightarrow k1}, \mathcal{T}_{c \leftrightarrow k2}, \mathcal{T}_{k1 \leftrightarrow k2}$) and depth consistency loss ($\mathcal{D}_c$)):

$$\mathcal{L} = \alpha \mathcal{P}_c + \beta \mathcal{S}_c + \gamma \mathcal{D}_c + \mu \mathcal{T}_{c \leftrightarrow k1} + \mathcal{T}_{c \leftrightarrow k2} \mathcal{T}_{k1 \leftrightarrow k2}.$$

In conclusion, the exemplary embodiments introduce a self-improving framework to couple geometrical and learning based methods for 3D perception. A win-win situation is achieved as both the monocular SLAM and depth prediction are improved by a significant margin without any additional active depth sensor or ground truth label.

As a result, SLAM and the recently emerging CNNs for monocular depth prediction represent two largely disjoint approaches towards building a 3D map of the surrounding environment. The exemplary embodiments demonstrate that the coupling of these two by leveraging the strengths of each mitigates the other's shortcomings. Specifically, the exemplary embodiments introduce a joint narrow and wide baseline based self-improving framework, where on the one hand the CNN-predicted depth is leveraged to perform pseudo RGB-D feature-based SLAM, leading to better accuracy and robustness than the monocular RGB SLAM baseline. On the other hand, the bundle-adjusted 3D scene structures and camera poses from the more principled geometric SLAM are injected back into the depth network through novel wide baseline losses proposed for improving the depth prediction network, which then continues to contribute towards better pose and 3D structure estimation in the next iteration. It is emphasized that the exemplary framework only needs unlabeled monocular videos in both training and inference stages, and yet is able to outperform state-of-the-art self-supervised monocular and stereo depth prediction networks (e.g., Monodepth2) and feature-based monocular SLAM system (e.g., ORB-SLAM).

Figure 6:
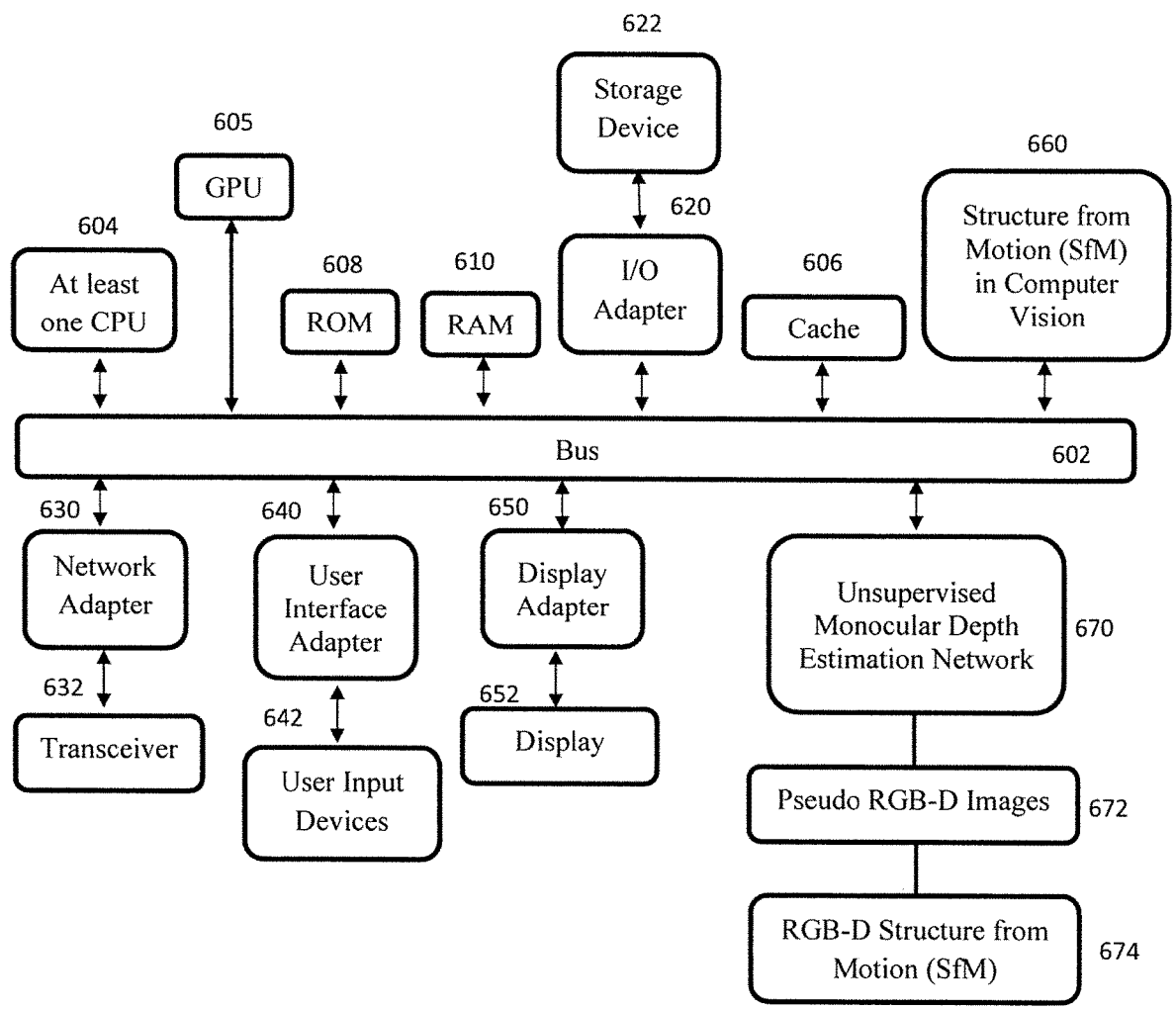
FIG. 6 is block/flow diagram of an exemplary processing system for improving geometry-based monocular structure from motion (SfM) by exploiting depth maps predicted by convolutional neural networks (CNNs), in accordance with embodiments of the present invention.

FIG. 6 is block/flow diagram of an exemplary processing system for improving geometry-based monocular structure from motion (SfM) by exploiting depth maps predicted by convolutional neural networks (CNNs), in accordance with embodiments of the present invention.

The processing system includes at least one processor or processor device (CPU) 604 and a graphics processing unit (GPU) 605 operatively coupled to other components via a system bus 602. A cache 606, a Read Only Memory (ROM) 608, a Random Access Memory (RAM) 610, an input/output (I/O) adapter 620, a network adapter 630, a user interface adapter 640, and a display adapter 650, are operatively coupled to the system bus 602. Structure from Motion (SfM) in Computer Vision 660 can be employed via the bus 602. Structure from Motion (SfM) in Computer Vision 660 can be accomplished by employing an unsupervised monocular depth estimation network 670 via pseudo RGB-D images 672 to enable RGB-D Structure from Motion (SfM) 674.

A storage device 622 is operatively coupled to system bus 602 by the I/O adapter 620. The storage device 622 can be any of a disk storage device (e.g., a magnetic or optical disk storage device), a solid state magnetic device, and so forth.

A transceiver 632 is operatively coupled to system bus 602 by network adapter 630.

User input devices 642 are operatively coupled to system bus 602 by user interface adapter 640. The user input devices 642 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 642 can be the same type of user input device or different types of user input devices. The user input devices 642 are used to input and output information to and from the processing system.

A display device 652 is operatively coupled to system bus 602 by display adapter 650.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 7:
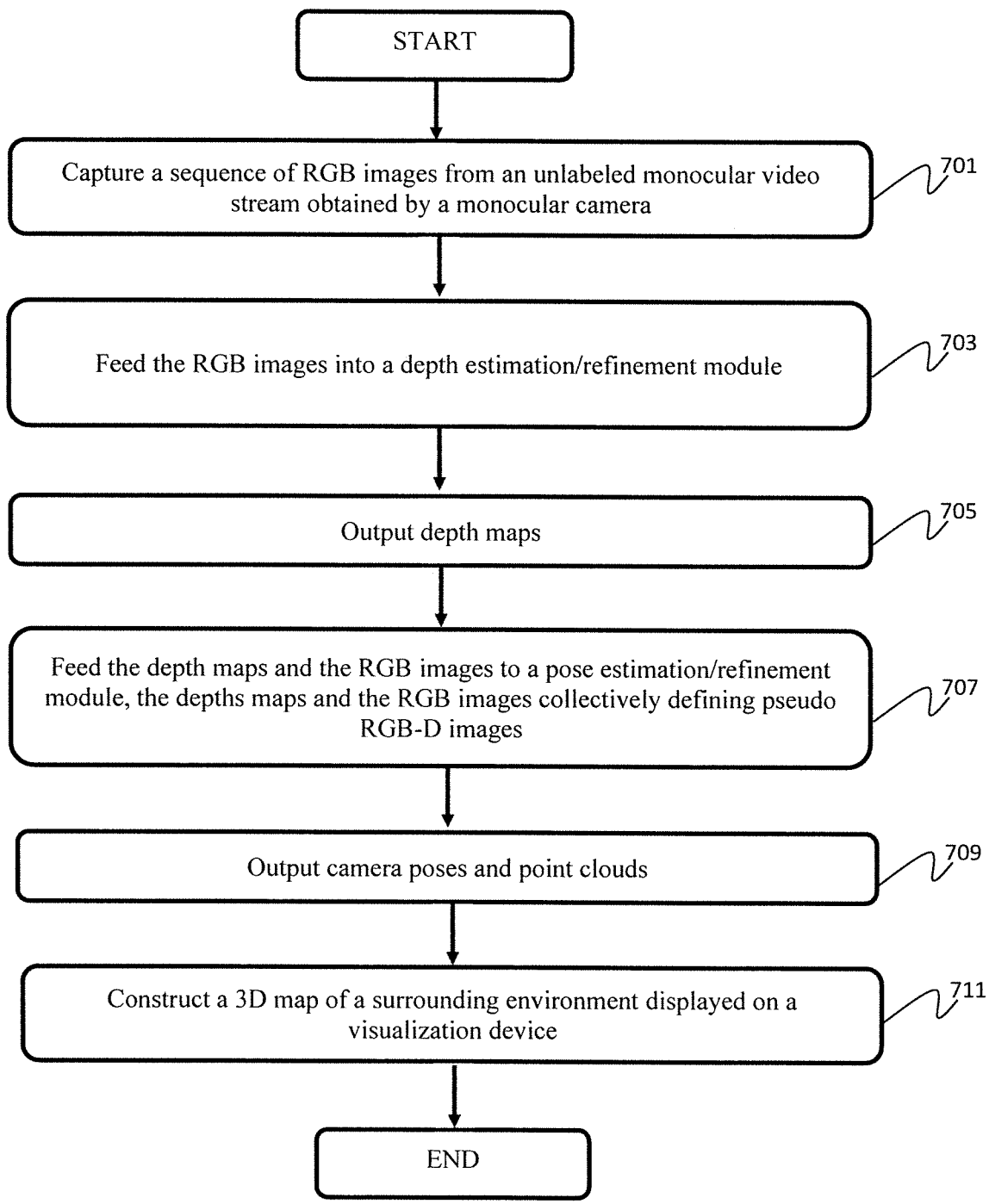
FIG. 7 is a block/flow diagram of an exemplary method for improving geometry-based monocular structure from motion (SfM) by exploiting depth maps predicted by convolutional neural networks (CNNs), in accordance with embodiments of the present invention.

FIG. 7 is a block/flow diagram of an exemplary method for improving geometry-based monocular structure from motion (SfM) by exploiting depth maps predicted by convolutional neural networks (CNNs), in accordance with embodiments of the present invention.

At block 701, capture a sequence of RGB images from an unlabeled monocular video stream obtained by a monocular camera.

At block 703, feed the RGB images into a depth estimation/refinement module.

At block 705, output depth maps.

At block 707, feed the depth maps and the RGB images to a pose estimation/refinement module, the depths maps and the RGB images collectively defining pseudo RGB-D images.

At block 709, output camera poses and point clouds.

At block 711, construct a 3D map of a surrounding environment displayed on a visualization device.

FIG. 8 is a block/flow diagram of equations employed in methods for improving geometry-based monocular structure from motion (SfM) by exploiting depth maps predicted by convolutional neural networks (CNNs), in accordance with embodiments of the present invention.

Equations 800 identify a symmetric depth transfer loss, a depth consistency loss, a photometric reconstruction loss, and a weighted sum of the narrow and wide baseline losses.

Figure 9:
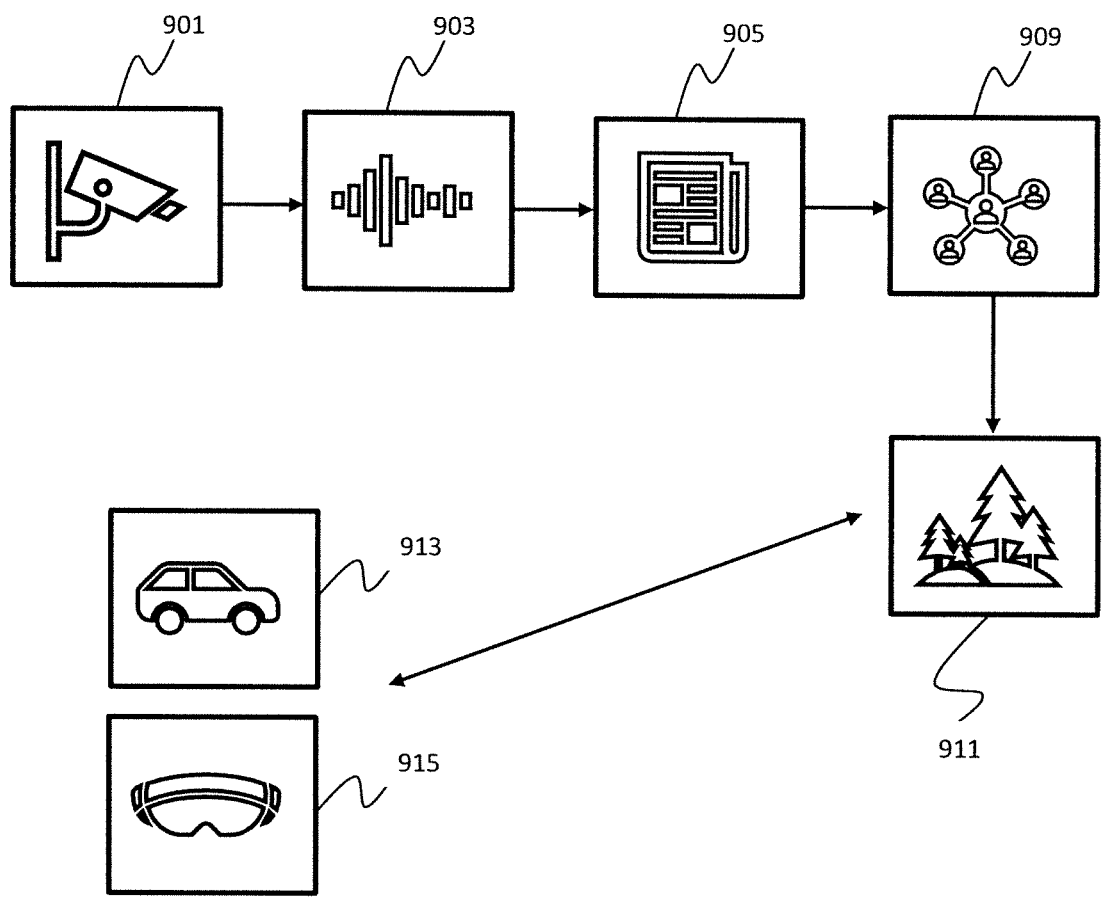
FIG. 9 is a block/flow diagram of a practical application for improving geometry-based monocular structure from motion (SfM) by exploiting depth maps predicted by convolutional neural networks (CNNs), in accordance with embodiments of the present invention.

FIG. 9 is a block/flow diagram of a practical application for improving geometry-based monocular structure from motion (SfM) by exploiting depth maps predicted by convolutional neural networks (CNNs), in accordance with embodiments of the present invention.

A monocular camera 901 receives a sequence of RGB images 905 from an unlabeled monocular video stream 903. The RGB images 905 are fed into an unsupervised monocular depth estimation network and an RGB-D SLAM system 909 to determine camera poses and point clouds, which aid in constructing a 3D map 911 of a surrounding environment displayed on a visualization device. Computer vision applications for employing the unsupervised monocular depth estimation network 909 include at least autonomous driving 913 and augmented reality 915.

Figure 10:
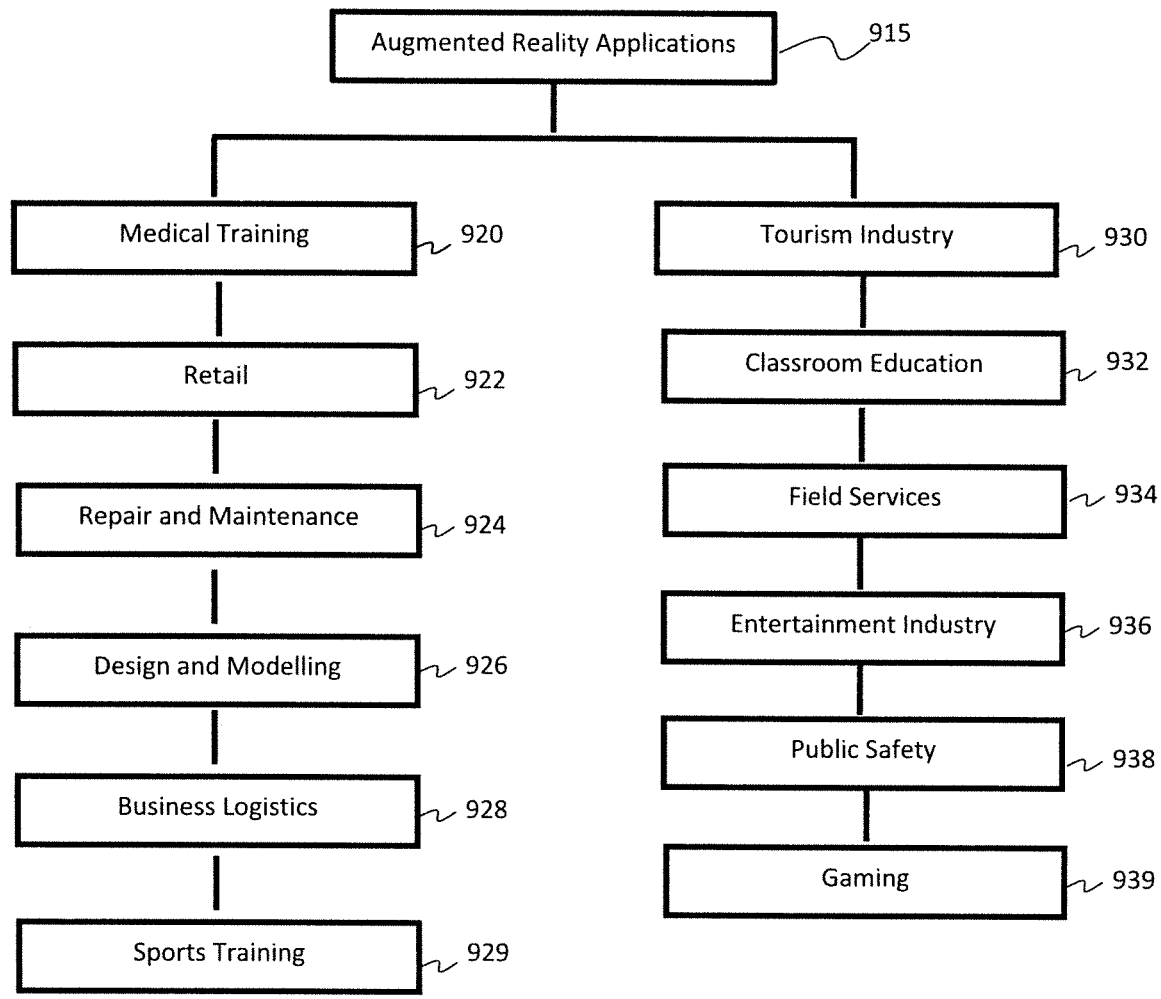
FIG. 10 is a block/flow diagram of example augmented reality applications for employing the unsupervised monocular depth estimation network, in accordance with embodiments of the present invention.

FIG. 10 is a block/flow diagram of example augmented reality applications for employing the unsupervised monocular depth estimation network and the pseudo RGBD SLAM, in accordance with embodiments of the present invention.

The exemplary embodiments of the present invention can be employed with any augmented reality applications 915. Some example augmented reality applications include medical training 920, retail 922, repair and maintenance 924, design and modelling 926, business logistics 928, sports training 929, tourism industry 930, classroom education 932, field services 934, entertainment industry 936, public safety 938, and gaming 939 to name a few.

For example, regarding medical training 920, from operating magnetic resonance imaging (MRI) equipment to performing complex surgeries, AR tech holds the potential to boost the depth and effectiveness of medical training in many areas.

Regarding retail 922, e.g., in today physical retail environment, shoppers are using their smartphones more than ever to compare prices or look up additional information on products they are browsing.

Regarding repair and maintenance 924, e.g., one of the biggest industrial use cases of AR is for repair and maintenance of complex equipment. Whether it is a car motor or an MRI machine, repair and maintenance staff are beginning to use AR headsets and glasses while they perform their jobs to provide them with useful information on the spot, suggest potential fixes, and point out potential trouble areas.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for improving geometry-based monocular structure from motion (SfM) by exploiting depth maps predicted by convolutional neural networks (CNNs), the method comprising:

capturing a sequence of RGB images from an unlabeled monocular video stream obtained by a monocular camera;

feeding the RGB images into a CNN-based depth estimation/refinement module network;

outputting depth maps;

feeding the depth maps and the RGB images to a pose estimation/refinement network, the depths maps and the RGB images collectively defining pseudo RGB-D images;

outputting camera poses and point clouds; and constructing a 3D map of a surrounding environment displayed on a visualization device, wherein appearance-based losses are computed on narrow baselines and purely geometric losses are computed on wide baselines such that a total loss for fine-tuning the depth estimation/refinement network is a weighted sum of narrow baseline losses, wide baseline losses, and depth consistency losses given as:

$$\mathcal{L} = \alpha \mathcal{P}_c + \beta \mathcal{S}_c + \gamma \mathcal{D}_c + \mu(\mathcal{T}_{c \leftrightarrow k1} + \mathcal{T}_{c \leftrightarrow k2} \mathcal{T}_{k1 \leftrightarrow k2})$$

where $\alpha$, $\beta$, $\gamma$, and $\mu$ are loss terms, $\mathcal{P}_c$ is a photometric loss, $\mathcal{S}_c$ is a smoothness loss, $\mathcal{D}_c$ is a depth consistency loss and $\mathcal{T}_{c \leftrightarrow k1}$, $\mathcal{T}_{c \leftrightarrow k2}$, and $\mathcal{T}_{k1 \leftrightarrow k2}$ are symmetric transfer losses between frames.

2. The method of claim 1, wherein common tracked keypoints from neighboring keyframes are employed.

3. The method of claim 2, wherein the symmetric transfer losses and the depth consistency loss are imposed on the common tracked keypoints.

4. The method of claim 3, wherein the symmetric transfer losses are given as:

$$\mathcal{T}^i_{c \leftrightarrow k1}(w) = |d_{c \to k1}{}^i(w) - d_{k1}{}^i(w)| + |d_{k1 \to c}{}^i(w) - d_c{}^i(w)|$$

where $d_{k1}{}^i(w)$ and $d_c{}^i(w)$ are the depth values from the depth network, $d_{c \to k1}{}^i(w)$ and $d_{k1 \to c}{}^i(w)$ are the transferred depth values, $k_1$ and $k_2$ are two neighboring keyframes of a current frame c, and w represents the depth network parameters.

5. The method of claim 4, wherein the depth consistency loss is given as:

$$D_c = \frac{\Sigma_{i \in \mathcal{X}} |d_c^i(w) - d_c^i(SLAM)|}{|\mathcal{X}|}$$

where X represents a set of common tracked keypoints, c is a current frame, w is a depth network parameter, $d_c{}^i(w)$ is a depth value from the depth network, and $d_c{}^i(SLAM)$ is a depth value from SLAM.

6. The method of claim 5, wherein the photometric loss between a synthesized frame and a current frame is given as:

$$\mathcal{P}_c = \text{pe}(I_{c+1 \to c}(d_c(w), T_{c+1 \to c}^{SLAM}, K), I_c) + \text{pe}(I_{c+1 \to c}(d_c(w), T_{c-1 \to c}^{SLAM}, K), I_c),$$

where $I_c$ is a current keyframe, $I_{c-i}$ and $I_{c+1}$ are adjacent frames, K is a camera intrinsic matrix, w is the depth network parameter, $d_c(w)$ is a network-predicted depth value, and $T_{c-1 \to c}^{SLAM}$ and $T_{c+1 \to c}^{SLAM}$ represent relative camera poses between two frames.

7. The method of claim 6, wherein the unlabeled monocular video stream is used in both training and inference stages.

8. A non-transitory computer-readable storage medium comprising a computer-readable program for improving geometry-based monocular structure from motion (SfM) by exploiting depth maps predicted by convolutional neural networks (CNNs), wherein the computer-readable program when executed on a computer causes the computer to perform the steps of:

capturing a sequence of RGB images from an unlabeled monocular video stream obtained by a monocular camera;

feeding the RGB images into a CNN-based depth estimation/refinement network;

outputting depth maps;

feeding the depth maps and the RGB images to a pose estimation/refinement network, the depths maps and the RGB images collectively defining pseudo RGB-D images;

outputting camera poses and point clouds; and constructing a 3D map of a surrounding environment displayed on a visualization device wherein appearance-based losses are computed on narrow baselines and purely geometric losses are computed on wide baselines such that a total loss for fine-tuning the depth estimation/refinement network is a weighted sum of narrow baseline losses, wide baseline losses, and depth consistency losses given as:

$$\mathcal{L} = \alpha \mathcal{P}_c + \beta \mathcal{S}_c + \gamma \mathcal{D}_c + \mu (\mathcal{T}_{c \leftrightarrow k_1} + \mathcal{T}_{c \leftrightarrow k_2}, \mathcal{T}_{k_1 \leftrightarrow k_2})$$

where $\alpha, \beta, \gamma$, and $\mu$ are loss terms, $\mathcal{P}_c$ is a photometric loss, $\mathcal{S}_c$ is a smoothness loss, $\mathcal{D}_c$ is a depth consistency loss and $\mathcal{T}_{c \leftrightarrow k_1}$, $\mathcal{T}_{c \leftrightarrow k_2}$, and $\mathcal{T}_{k_1 \leftrightarrow k_2}$ are symmetric transfer losses between frames.

9. The non-transitory computer-readable storage medium of claim 8, wherein common tracked keypoints from neighboring keyframes are employed.

10. The non-transitory computer-readable storage medium of claim 9, wherein the symmetric transfer losses and the depth consistency loss are imposed on the common tracked keypoints.

11. The non-transitory computer-readable storage medium of claim 10, wherein the symmetric transfer is losses are given as:

$$\mathcal{T}^i_{c \leftrightarrow k_1}(w) = |d_{c \to k_1}{}^i(w) - d_{k_1}{}^i(w)| + |d_{k_1 \to c}{}^i(w) - d_c{}^i(w)|$$

where $d_{k_1}{}^i(w)$ and $d_c{}^i(w)$ are the depth values from the depth network, $d_{c \to k_1}{}^i(w)$ and $d_{k_1 \to c}{}^i(w)$ are the transferred depth values, $k_1$ and $k_2$ are two neighboring keyframes of a current frame c, and w represents the depth network parameters.

12. The non-transitory computer-readable storage medium of claim 11, wherein the depth consistency loss is given as:

$$D_c = \frac{\Sigma_{i \in \mathcal{X}} |d_c^i(w) - d_c^i(SLAM)|}{|\mathcal{X}|}$$

where X represents a set of common tracked keypoints, c is a current frame, w is a depth network parameter, $d_c{}^i(w)$ is a depth value from the depth network, and $d_c{}^i(SLAM)$ is a depth value from SLAM.

13. The non-transitory computer-readable storage medium of claim 12, wherein the photometric loss between a synthesized frame and a current frame is given as:

$$\mathcal{P}_c = \text{pe}(I_{c+1 \to c}(d_c(w), T_{c+1 \to c}{}^{SLAM}, K), I_c) + \text{pe}(I_{c+1 \to c}(d_c(w), T_{c-1 \to c}{}^{SLAM}, K), I_c),$$

where $I_c$ is a current keyframe, $I_{c-i}$ and $I_{c+1}$ are adjacent frames, K is a camera intrinsic matrix, w is the depth network parameter, $d_c(w)$ is a network-predicted depth value, and $T_{c-1 \to c}{}^{SLAM}$ and $T_{c+1 \to c}{}^{SLAM}$ represent relative camera poses between two frames.

14. The non-transitory computer-readable storage medium of claim 13, wherein the unlabeled monocular video stream is used in both training and inference stages.

15. A system for improving geometry-based monocular structure from motion (SfM) by exploiting depth maps predicted by convolutional neural networks (CNNs), the system comprising:

a memory; and one or more processors in communication with the memory configured to:

capture a sequence of RGB images from an unlabeled monocular video stream obtained by a monocular camera;

feed the RGB images into a CNN-based depth estimation/refinement network;

output depth maps;

feed the depth maps and the RGB images to a pose estimation/refinement network, the depths maps and the RGB images collectively defining pseudo RGB-D images;

output camera poses and point clouds; and construct a 3D map of a surrounding environment displayed on a visualization device, wherein appearance-based losses are computed on narrow baselines and purely geometric losses are computed on wide baselines such that a total loss for fine-tuning the depth estimation/refinement network is a weighted sum of narrow baseline losses, wide baseline losses, and depth consistency losses given as:

$$\mathcal{L} = \alpha \mathcal{P}_c + \beta \mathcal{S}_c + \gamma \mathcal{D}_c + \mu (\mathcal{T}_{c \leftrightarrow k_1} + \mathcal{T}_{c \leftrightarrow k_2}, \mathcal{T}_{k_1 \leftrightarrow k_2})$$

where $\alpha, \beta, \gamma$, and $\mu$ are loss terms, $\mathcal{P}_c$ is a photometric loss, $\mathcal{S}_c$ is a smoothness loss, $\mathcal{D}_c$ is a depth consistency loss and $\mathcal{T}_{c \leftrightarrow k_1}$, $\mathcal{T}_{c \leftrightarrow k_2}$, and $\mathcal{T}_{k_1 \leftrightarrow k_2}$ are symmetric transfer losses between frames.

16. The system of claim 15, wherein common tracked keypoints from neighboring keyframes are employed.

17. The system of claim 16, wherein the symmetric transfer losses and the depth consistency loss are imposed on the common tracked keypoints.

18. The system of claim 17, wherein the symmetric transfer losses are given as:

$$\mathcal{T}^i_{c \leftrightarrow k_1}(w) = |d_{c \to k_1}{}^i(w) - d_{k_1}{}^i(w)| + |d_{k_1 \to c}{}^i(w) - d_c{}^i(w)|$$

where $d_{k_1}{}^i(w)$ and $d_c{}^i(w)$ are the depth values from the depth network, $d_{c \to k_1}{}^i(w)$ and $d_{k_1 \to c}{}^i(w)$ are the transferred depth values, $k_1$ and $k_2$ are two neighboring keyframes of a current frame c, and w represents the depth network parameters.

19. The system of claim 18, wherein the depth consistency loss is given as:

$$D_c = \frac{\Sigma_{i \in \mathcal{X}} |d_c^i(w) - d_c^i(SLAM)|}{|\mathcal{X}|}$$

where X represents a set of common tracked keypoints, c is a current frame, w is a depth network parameter, $d_c{}^i(w)$ is a depth value from the depth network, and $d_c{}^i(SLAM)$ is a depth value from SLAM.

20. The system of claim 19, wherein the photometric loss between a synthesized frame and a current frame is given as:

$$\mathcal{P}_c = \text{pe}(I_{c+1 \to c}(d_c(w), T_{c+1 \to c}{}^{SLAM}, K), I_c) + \text{pe}(I_{c+1 \to c}(d_c(w), T_{c-1 \to c}{}^{SLAM}, K), I_c),$$

where $I_c$ is a current keyframe, $I_{c-i}$ and $I_{c+1}$ are adjacent frames, K is a camera intrinsic matrix, w is the depth network parameter, $d_c(w)$ is a network-predicted depth value, and $T_{c-1 \to c}{}^{SLAM}$ and $T_{c+1 \to c}{}^{SLAM}$ represent relative camera poses between two frames.

\* \* \* \* \*